June 21, 1960

D. J. KLEE 2,941,821

COOLING FLUID FLOW CONTROL VALVE FOR AN ELECTRODE SUPPORT

Filed March 30, 1959

INVENTOR.
David J. Klee
BY
M W Goodwin

His Attorney

INVENTOR.
David J. Klee
BY M W Goodwin
His Attorney

United States Patent Office 2,941,821
Patented June 21, 1960

2,941,821
COOLING FLUID FLOW CONTROL VALVE FOR AN ELECTRODE SUPPORT

David J. Klee, Shelbyville, Ind., assignor to General Electric Company, a corporation of New York Filed Mar. 30, 1959, Ser. No. 802,809

8 Claims. (Cl. 284—19)

This invention relates to electric arc furnaces and, more particularly, to an electrode support for such a furnace having a novel and improved electrode extension actuatable flow control valve for controlling the flow of cooling fluid from flow passages within the electrode support to corresponding flow passages in an electrode extension supported by the electrode support.

Electric arc furnaces for the melting of metal fall generally into two classes: that is, those using a consumable electrode which itself is melted by an arc between the electrode and a pool of molten metal contained in a crucible; and those using a non-consumable electrode wherein the electrode is used solely to provide an arc between itself and a pool of metal within a crucible, with the material to be melted being fed into or adjacent the arc for melting thereby or with the material to be melted being initially disposed in its entirety within the crucible. In the case of a non-consumable electrode arc furnace, the electrode often is in the form of a tip of tungsten or other suitable material carried by one end of an elongated electrode extension, with the electrode extension having internal passages for the circulation of cooling fluid to cool the tip. In the case of a consumable electrode, the electrode is usually supported by an electrode support which itself is mounted for movement relative to the furnace body in order to advance the electrode in accordance with the consumption thereof. Often a furnace particularly designed for use with a non-consumable electrode is not suitable for use with a consumable electrode, primarily because it is not provided with the necessary means for advancing the rather long consumable electrode. On the other hand, there are furnaces, such as of the type shown in copending United States patent application Serial No. 749,977, filed July 21, 1958, in the names of Lloyd W. Johnson and David J. Klee, which may be used either with a non-consumable or consumable electrode.

It is the primary object of this invention to provide a novel and improved arrangement for controlling the flow of cooling fluid through an electrode support of the type adapted to support either a consumable electrode or an electrode extension, which will automatically connect the cooling fluid passages of the electrode support with the cooling fluid passages of an electrode extension in response to the engagement of the extension with the support and which will prevent fluid flow from the electrode support when either the electrode extension is not engaged with the support or when a consumable electrode is so engaged.

Other objects and advantages of the invention as well as the details of construction of a specific embodiment of the invention will be apparent from the following description taken in connection with the accompanying drawings, in which.

Figure 1:
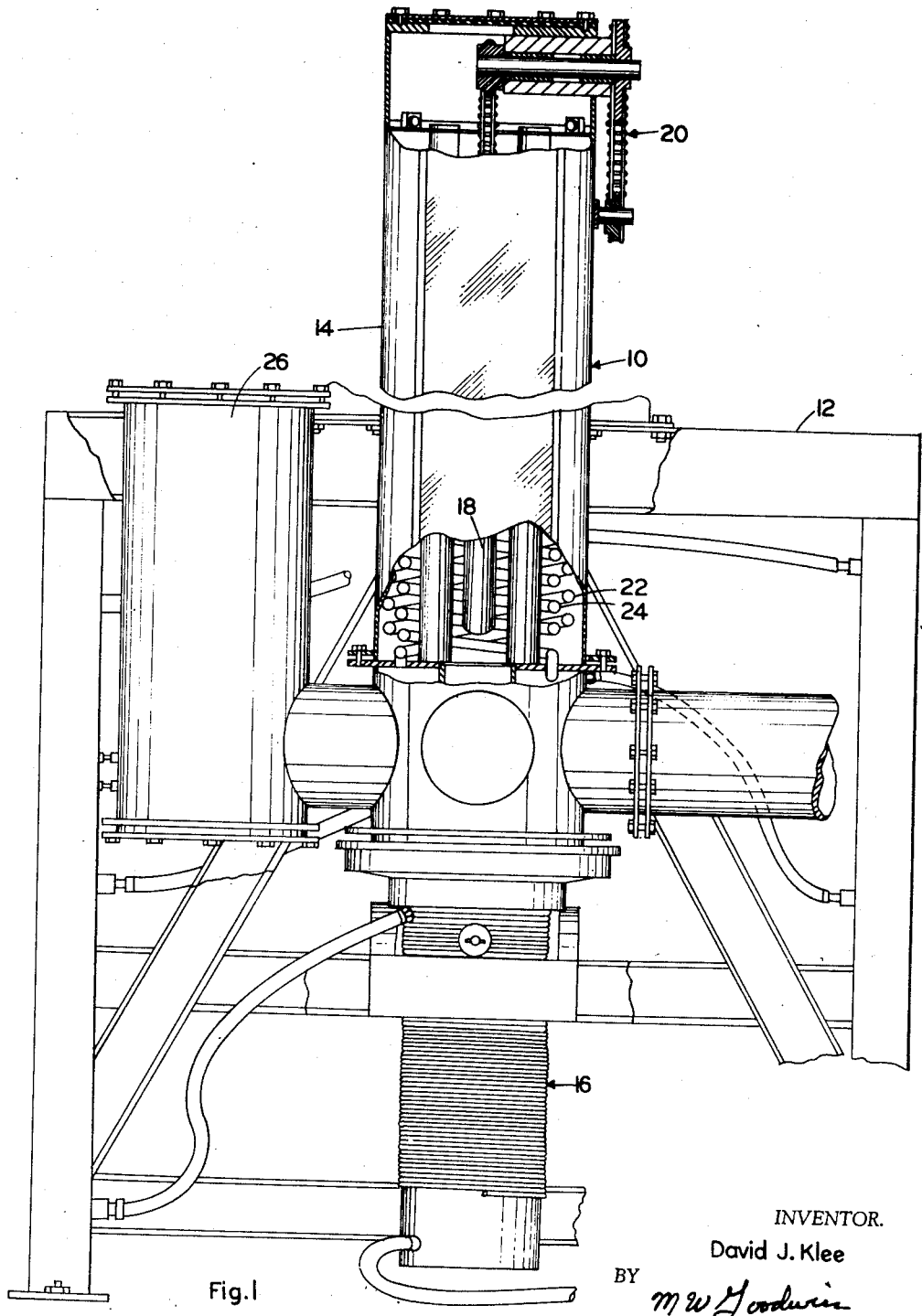
Fig. 1 is a fragmentary elevational view of an exemplary electric arc furnace with which this invention is concerned.

With reference to Fig. 1 of the drawings, an exemplary furnace, with which this invention is particularly adapted for use, generally comprises a furnace body portion 10 supported by a frame 12 and including an elongated cylindrical electrode housing 14. Depending from the body 10 in alignment therewith is a crucible 16. An electrode 18 is vertically supported within the furnace body by an electrode support (not shown) connected to drive mechanism 20 for controlling raising and lowering of the electrode support and electrode relative to the crucible. The electrode support may be of any suitable type; however, a preferred support is shown in the aforementioned copending application and is of the type wherein the electrode support comprises a pair of concentric tubes defining a pair of concentric fluid passages extending longitudinally of the support, with the passages being connected to a pair of concentric helical tubular conduits such as shown at 22, 24 in Fig. 1. These conduits provide means for introducing and draining fluid from the passages in the electrode support and in spring-like fashion will expand and contract during movement of the electrode support relative to the furnace body, thus eliminating the need for flexible looped conduits within or without the furnace body to accommodate movement of the electrode support. This particular form of electrode support and especially the concentric helical coil configuration for providing flow to and from the support do not form a part of this invention but rather form part of the invention of the aforementioned application, which may be referred to for such additional detailed information as is necessary or desired. The furnace shown in Fig. 1 is adapted to be used with either a consumable or non-consumable electrode, a consumable electrode being specifically shown in Fig. 1. The furnace is provided with a hopper 26 connected to the furnace body for feeding material to be melted into the furnace body when a non-consumable electrode melting operation is desired.

Figures 2, 3:
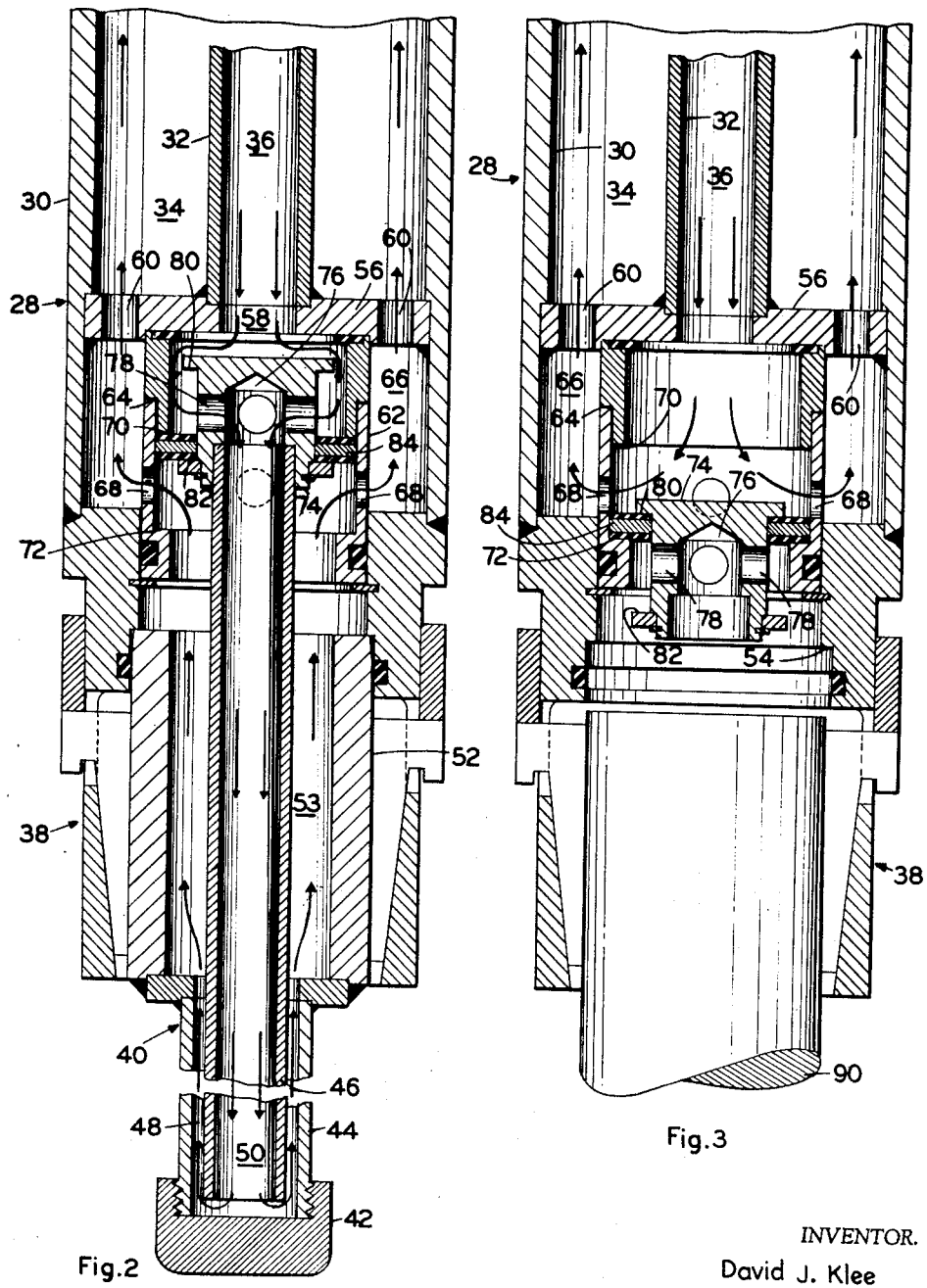
Fig. 2 is a fragmentary enlarged longitudinal cross sectional view of the electrode support of the furnace of Fig. 1, supportingly engaging a non-consumable electrode extension illustrated in longitudinal cross section.
Fig. 3 is a fragmentary enlarged longitudinal cross section of the electrode extension of the furnace of Fig. 1 with a consumable electrode engaged thereby.

With reference to Fig. 2, an electrode support 28, such as of the type disclosed in the aforementioned application, is shown and comprises a pair of tube members 30 and 32 coaxially arranged one within the other to provide a pair of fluid cooling passages 34 and 36. An electrode clamp 38 is carried by the outer tube 30 at one end of the electrode support and as shown in Fig. 2 is constructed to receive and clampingly engage an electrode extension 40 having at its lower end a non-consumable electrode tip 42. The electrode extension 40 comprises a pair of tubular members 44 and 46 coaxially arranged one within the other to provide a pair of fluid passages 48 and 50. The lower end of the inner tube 46 is spaced from the electrode tip 42 to provide for communication between the passages 48 and 50 so that cooling fluid may be circulated in heat exchange relationship with the tip 42. An adapter 52 in the form of a cylinder is secured to the upper end of the outer tube 44 and is receivable within the electrode clamp 38, with the upper end of the cylinder abutting an internal shoulder 54 in the clamp to limit movement of the electrode extension into the clamp. The cylinder 52 is arranged coaxially about the inner tube 46 in radially outwardly spaced relation to provide an annular fluid passage 53 which is in communication with the passage 48 between the inner and outer tubes 44 and 46. The inner tube 46 of the electrode extension projects beyond the terminal end of the adaptor 52 for a reason which will be hereinafter apparent.

A disc-like member 56 is fixed within the outer tube 30 of the electrode support and secured to the lower end of the inner tube 32. The disc is provided with a central aperture or opening 58 registering with the lower end of the passage 36 and further has a plurality of openings 60 extending therethrough and communicating with the passage 34 in the electrode support. In accordance with the invention, a valve 62 is carried by the electrode support at the lower end thereof and comprises an open ended hollow cylindrical body 64 fixed to the disc or wall 56 and extending generally coaxially of the inner tube 36 of the electrode support. The upper end of the valve body surrounds the opening 58 in the wall 56 in sealed relation, while the lower open end of the valve body is in communication with the interior of the electrode clamp in which the electrode extension is receivable. The side walls of the valve body 64 are spaced radially inwardly of the outer tube 30 of the electrode support and the openings 60 in the wall 56 to define an annular passage 66 around the valve body which is in open communication with the passage 34 of the electrode support. A fluid-tight seal is provided at the lower end of the valve body between the valve body and a portion of the electrode clamp, in the specific embodiment shown, to prevent leakage of fluid from the passage 66 outwardly of the lower end of the body and electrode support. The side walls of the valve body are further provided with ports or openings 68 providing flow communication between the passage 66 and the interior of the valve body and with a pair of oppositely facing annular or continuous shoulders 70 and 72 arranged coaxially of the valve body and spaced apart axially thereof on opposite sides of the ports 68. Disposed within the valve body for movement generally coaxially thereof is a valve member 74 which is generally cylindrical in shape. The valve member is provided with a coaxially extending recess or opening 76 extending from its lower end and which is counterbored to provide an enlarged recess in which is receivable the projecting terminal end of the inner tube 46 of the electrode extension previously described. The valve member 74 is further provided with laterally extending passages 78 extending generally at right angles to the path of movement of the valve member, or, in other words, radially of the valve body and connecting the passage 76 with the interior of the valve body. The valve member 74 is further provided with a pair of oppositely facing annular or continuous shoulders 80 and 82 spaced apart in the direction of movement of the valve member or axially thereof and on opposite sides of the lateral passages 78. An annular sealing member 84 surrounds the valve member 74 and is movable relative thereto between engagement with the shoulders 80 and 82. In the specific embodiment shown, the sealing member 84 comprises an annular metal member which is faced on the opposite sides thereof with sealing material such as rubber in order to provide sealing engagement between the sealing member or secondary valve member 84 and the shoulders 80 and 82. Of course, as will be apparent, the sealing member 84 could if desired be fabricated entirely of sealing material, or the shoulders 80 and 82 could be faced with sealing material and the secondary valve member 84 fabricated entirely of metal or the like. As will be apparent from Fig. 2, the sealing member 84 is further engageable with the shoulders 70 and 72 on the valve body to limit movement of the valve member in opposite directions coaxially of the electrode support.

In the use of an electrode support such as shown in Fig. 2, and incorporating a valve such as disclosed in Fig. 2, the engagement of the electrode extension 40 with the clamp 38 will result in insertion of the upper end of the inner tube 46 of the extension into the counterbored portion of the opening 76 in the valve member, and during movement of the extension 40 longitudinally of the support and toward the lower end thereof the valve member 74 will be moved upwardly into the valve body. During such movement of the valve member the sealing member or secondary valve member 84 will be engaged between the shoulder 70 on the valve body and the shoulder 82 on the valve member to limit upward movement of the valve member. In this position of the valve member, the inner passage 36 of the electrode support will be connected to the inner passage 50 of the electrode extension through the interior of the valve body, the valve member cross passages 78, and the upwardly extending passage 76 in the valve member. The outer passage 34 of the electrode support will at this time be connected to the outer passage 48 in the electrode extension through the annular passage 66, lateral openings 68 in the valve body, and the open bottom of the valve body. As will be apparent from Fig. 2, the sealing member serves to provide a fluid seal between the incoming and outgoing fluid passing through the valve body.

With reference to Fig. 3, wherein like numerals refer to like structures in Fig. 2, it can be seen that when the extension 40 is not engaged in the electrode clamp, or when a consumable electrode is engaged therein, the valve will be closed to prevent fluid flow outwardly of the support. More specifically, in the absence of the extension 40, the valve member 74 will be in its lower position wherein it extends through the open bottom end of the valve body. The sealing member 84 is in this position of the valve member engaged between the valve body shoulder 72 and valve member shoulder 80. In the specific embodiment shown in Fig. 3, a fluid circulation is provided between the inner and outer passages of the electrode support when the valve member is in its closed position. However, as is apparent, if desired, provision for such circulation of the fluid may be omitted. Further, as will be apparent from Fig. 3, with the valve member in its closed position the passage 76 within the valve member, as well as the cross passages 78 in the valve member, are on the opposite side of the sealing member 84 from the fluid in the electrode support. Also, the sealing member 84 serves to prevent any flow of fluid out of the open bottom end of the valve body.

In the illustration of Fig. 3, the upper end of the consumable electrode 90 is spaced a substantial distance from the lower end of the valve member 74. As should be particularly noted, however, if inadvertently the electrode should be inserted too far within the clamp, it will engage the shoulder 54 which is disposed in spaced relation to the lower end of the valve member and toward the lower end of the electrode support. Thus, even if the upper end of the electrode 90 were engaged with the shoulder, it would still be spaced from the valve member so as not to effect actuation thereof. Thus, when the valve member is in its closed position it provides complete fluid sealing of the internal passages of the electrode support to prevent fluid flow out of the bottom end of the support. It should be particularly noted that when such an electrode support and valve arrangement is utilized in a vacuum arc furnace the differential pressure across the valve member will be such as to assure that the valve member will be maintained in total fluid sealing relationship.

Thus it can be seen that there has been provided a novel and improved valve arrangement for an electrode support of the type described in which actuation is effected in response to the particular type of electrode engaged in the support so as to automatically couple the cooling fluid passages of an electrode extension with like passages in the electrode support, while assuring that the electrode support passages will remain sealed when a consumable electrode is engaged by the support. The vacuum type seal provided by the valve is obtained without the use of expensive O-rings or sliding seals, and the over-all assembly is relatively simple and economical to manufacture and is easy to remove for maintenance if such should be necessary.

While the invention has been described in terms of the specific embodiment shown, it should be understood that various modifications and alterations may be made in the specific structure without departing from the scope of the invention. Accordingly, it is intended that the foregoing description and drawings shall be taken only in an illustrative sense and that the invention is to be limited only by the appended claims, which shall include within their scope all structure which logically falls within the language of these claims.

What I claim as new and desire to secure by Letters Patent of the United States is:

1. In an electrode support for an electric arc furnace, the electrode support having inlet and outlet cooling fluid passages adapted to be connected to inlet and outlet cooling fluid passages of an electrode extension supported at one end of the electrode support, a valve carried by the electrode support adjacent said one end thereof for controlling fluid flow between the passages in the electrode support and the passages in an electrode extension carried by the support, the valve including a valve body having a first passage connected to one of the passages in the electrode support and a second passage for connection to one of the passages in an electrode extension carried by the support, the valve body having a third passage connected to another of the passages in the electrode support, and means to connect and disconnect said first and second passages and to connect said third passage with another passage in the electrode extension including valve member means in the valve body movable between a flow obstructing first position between said first and second passages and a second position permitting flow between said first and second passages, the valve member means including a flow passage therethrough connected at one end to said third passage when said valve member means is in said second position and sealed from said third passage when said valve member means is in said first position, and means on the valve member means engageable with an electrode extension during movement of the extension into supporting engagement by the electrode support to shift the valve member means from said first to said second position.

2. In an electrode support assembly for an electric arc furnace, including an electrode support having an inlet cooling fluid passage and an outlet cooling fluid passage and having at one end means for engaging an electrode extension of the type having an inlet cooling fluid passage and an outlet cooling fluid passage; a valve carried by the electrode support and including a hollow valve body fixed to the support adjacent said one end thereof and an electrode extension engageable valve member in said body movable relative thereto toward and away from said one end of the electrode support, the valve member having a fluid passage extending therethrough opening at one end outwardly of the valve body toward said one end of the electrode support and opening at the other end thereof in a direction laterally of the path of movement of the valve member and into the interior of the valve body, the valve body having a fluid passage connected at one end to one of the inlet and outlet passages in the electrode support and opening at the other end into the valve body, a pair of oppositely facing internal shoulders on the valve body disposed on opposite sides of said other end of the passage in the body and spaced apart in the direction of movement of said valve member, a pair of oppositely facing external shoulders on the valve member disposed on opposite sides of said other end of the passage therein and spaced apart in the direction of movement of the valve member, a secondary valve member surrounding the first valve member and movable relative thereto between sealing engagement with each of said shoulders on the valve member, the secondary valve member exposing at least a portion of said other end of the valve member fluid passage when engaged with the valve member shoulder disposed closer to said one end of the electrode support, the secondary valve member further being sealingly engageable with the shoulders of the valve body to limit movement of the valve member in both directions relative to the body and when in engagement with the body shoulder further from said one end of the electrode support at least partially exposing said other end of the valve body passage, and means providing an additional pair of fluid passages in the valve body opening at one end into the valve body on opposite sides of said pair of shoulders on the valve body with the other end of one of said pair of passages being connected to the other of said passages in the electrode support and with the other end of the other of said pair of passages opening outwardly of the valve body toward said one end of the support assembly.

3. In combination, an electrode support assembly for an electric arc furnace including an electrode support having a pair of concentrically arranged inlet and outlet cooling fluid passages extending toward one end of the support, means at said one end of the support for receiving and engaging an end of an electrode extension of the type having a pair of concentrically arranged inlet and outlet cooling fluid passages, a valve carried by the electrode support and including a hollow valve body fixed to the support adjacent said one end thereof extending coaxially of said passages in the support, the body having an opening at one end communicating with the inner of said pair of passages in the support and an opening at the bottom end communicating with the interior of the electrode engaging means, an electrode extension engageable valve member in said body reciprocable relative thereto toward and away from said one end of the electrode support, the valve member being extendable through the valve body opening at said other end thereof in radially inwardly spaced relation and having a fluid passage extending therethrough and opening at one end at the end of the valve member extendable outwardly of the valve body, the valve member passage opening at its other end into the valve body in a direction extending laterally of the path of movement of the valve member, the valve body having a third opening connected at one end to the outer of the inlet and outlet passages in the electrode support and opening at its other end into the valve body between the ends thereof, a pair of oppositely facing internal shoulders on the valve body disposed on opposite sides of said third opening and spaced apart in the direction of movement of said valve member, a pair of oppositely facing external shoulders in the valve member disposed on opposite sides of said other end of the passage therein and spaced apart in the direction of movement of the valve member, and a secondary valve member surrounding the first valve member and movable relative thereto between sealing engagement with each of said shoulders on the valve member, the secondary valve member exposing at least a portion of said other end of the valve member fluid passage when engaged with the valve member shoulder disposed closer to said one end of the electrode support, the secondary valve member further being sealingly engageable with the shoulders of the valve body to limit movement of the valve member relative to the body and when in engagement with the body shoulder further from said one end of the electrode support at least partially exposing said other end of the valve body passage.

4. In an electrode support assembly for an electric arc furnace, the assembly including an electrode support having adjacent one end thereof an inlet cooling fluid passage and an outlet cooling fluid passage, a valve carried by the electrode support adjacent said one end including a hollow valve body fixed to the support and a valve member in said body reciprocable relative thereto toward and away from said one end of the electrode support, the valve member having a fluid passage extending therethrough opening at one end outwardly of the valve body toward said one end of the electrode support and opening at the other end in a direction extending laterally of the path of movement of the valve member into the interior of the valve body, the valve body having a fluid passage connected at one end to one of the inlet and outlet passages in the electrode support and opening at the other end into the valve body, a pair of oppositely facing internal shoulders on the valve body disposed on opposite sides of said other end of the passages in the body and spaced apart in the direction of movement of said valve member, a pair of oppositely facing external shoulders in the valve member disposed on opposite sides of said other end of the passage therein and spaced apart in the direction of movement of the valve member, a secondary valve member surrounding the first valve member and movable relative thereto and across said other end of the valve member passage between sealing engagement with each of said shoulders on the valve member, the secondary valve member further being sealingly engageable with the shoulders of the valve body to limit movement of the valve member relative to the body and when in engagement with either body shoulder being spaced from said other end of the valve body passage, and means providing an additional pair of fluid passages in the valve body opening at one end into the valve body on opposite sides of said pair of shoulders on the valve body with the other end of one passage of said pair of passages being connected to the other of said passages in the electrode support and with the other end of the other of said pair of passages opening outwardly of the valve body.

5. In an electrode support for an electric arc furnace having means at one end thereof defining an electrode receivable recess and engageable with an electrode or electrode extension when received in the recess to support the same, the electrode support further including a pair of coaxially arranged hollow members disposed one within the other in radially spaced relation to define a pair of fluid passages, a valve carried by the electrode support adjacent said one end thereof comprising a cylindrical valve body fixed to the electrode support and having an opening in the end thereof opposite said one end of the support connected to the inner one of the passages in the support, the other end of the body having an opening communicating with said electrode receivable recess, the valve body having side walls having a port connecting the interior of the valve body and the other outer passage in the electrode support, the valve body further having a pair of oppositely facing annular shoulders spaced apart axially of the body and on opposite sides of said port with one of said shoulders being disposed between said port and the opening at said other end of the valve body, a valve member movably received in the valve body for movement coaxially of the body with one end of the valve member being extendable outwardly through the opening in said other end of the valve body in radially spaced relation, said one end of the valve member being provided with a coaxial recess constructed to receive a tubular member or an electrode extension, a lateral flow passage in the valve member connected at one end to said coaxial recess and at the other end thereof opening laterally outwardly of the valve member, a pair of oppositely facing annular shoulders on the valve member spaced apart in the direction of movement of the valve member and on opposite sides of said other end of the lateral flow passage in the valve member, and an annular sealing member mounted coaxially about the valve member for axial movement relative thereto across said other end of said flow passage in the valve member between sealing engagement with said shoulders on the valve member and for movement with the valve member coaxially of the valve body across said port in the valve body and between sealing engagement with said shoulders on the valve body.

6. A valve assembly for selectively directing fluid along two different flow paths comprising a cylindrical hollow body having one end in communication with a fluid inlet passage, the cylindrical wall of the hollow body being apertured to provide a first outlet passage, a valve member positioned within the hollow body and having a central passage to provide a second outlet passage, an aperture in the wall of the valve member communicating with the central passage, and a sealing member positioned between the cylindrical wall of the hollow body and the valve member and movable with respect to both the hollow body and the valve member to positions on opposite ends of the apertures of both the hollow body and the valve member to provide selective communication between the inlet passage and the two outlet passages.

7. A valve assembly for selectively directing fluid along two different flow paths comprising a hollow body having one end in communication with a fluid inlet passage, the side wall of the hollow body being apertured to provide a first outlet passage, a valve member positioned within and spaced from the hollow body and having a central passage to provide a second outlet passage, the side wall of the valve member being apertured to provide communication between the central passage of the valve member and the space between the valve member and the hollow body, and a sealing member in the space between the hollow body and the valve member and positioned axially between the apertures of the hollow body and the valve member in a first operative position, the valve member, the sealing member, and the hollow body being relatively axially movable to reverse the relative axial positions of the apertures with respect to the sealing member in a second operative position to provide selective communication between the inlet passage and either of the two outlet passages.

8. A valve assembly as described in claim 7 wherein oppositely disposed shoulders are provided on the inner wall of the hollow body and the outer wall of the valve member to respectively engage the sealing member in its operative positions.

References Cited in the file of this patent
UNITED STATES PATENTS
2,819,912   Mitchell _____ Jan. 14, 1958